United States Patent
Iwanami et al.

(10) Patent No.: US 8,420,724 B2
(45) Date of Patent: Apr. 16, 2013

(54) CELLULOSE RESIN COMPOSITION AND CELLULOSE RESIN FILM

(75) Inventors: Kiyotatsu Iwanami, Saitama (JP); Tomoki Honda, Saitama (JP); Yutaka Yonezawa, Saitama (JP)

(73) Assignee: Adeka Corporation, Tokyo (JP)

( * ) Notice: Subject to any disclaimer, the term of this patent is extended or adjusted under 35 U.S.C. 154(b) by 78 days.

(21) Appl. No.: 12/918,035

(22) PCT Filed: Feb. 16, 2009

(86) PCT No.: PCT/JP2009/052532
§ 371 (c)(1),
(2), (4) Date: Sep. 3, 2010

(87) PCT Pub. No.: WO2009/104549
PCT Pub. Date: Aug. 27, 2009

(65) Prior Publication Data
US 2011/0015322 A1   Jan. 20, 2011

(30) Foreign Application Priority Data
Feb. 18, 2008  (JP) ................. 2008-035554

(51) Int. Cl.
C08K 5/103 (2006.01)
C08K 5/10 (2006.01)
C08L 1/08 (2006.01)
C08L 1/02 (2006.01)
C09D 101/08 (2006.01)

(52) U.S. Cl.
USPC ... 524/299; 524/311; 106/170.3; 106/170.34; 106/170.29

(58) Field of Classification Search .......... 524/299, 524/311; 106/170.3, 170.34, 170.29
See application file for complete search history.

(56) References Cited

U.S. PATENT DOCUMENTS
2006/0127607 A1*  6/2006  Okubo et al. ................. 428/1.3

FOREIGN PATENT DOCUMENTS
| JP | 53-40039 | 4/1978 |
| JP | 54-71141 A | 6/1979 |
| JP | 11-92574 A | 4/1999 |
| JP | 11-124445 A | 5/1999 |
| JP | 11-246704 A | 9/1999 |
| JP | 2000-63560 A | 2/2000 |
| JP | 2007-126571 A | 5/2007 |
| JP | 2007-144932 A | 6/2007 |
| JP | 2007-216601 A | 8/2007 |
| WO | 2008/117577 A1 | 10/2008 |

OTHER PUBLICATIONS
English machine translation of Suzuki et al. (JP 2007-126571).*
International Search Report dated May 19, 2009 issued in PCT/JP2009/052532.

* cited by examiner

*Primary Examiner* — Michael Pepitone
(74) *Attorney, Agent, or Firm* — Birch, Stewart, Kolasch & Birch, LLP

(57) ABSTRACT

Disclosed are a cellulose resin composition and cellulose resin film which prevent deterioration in the retainability and have a superior moisture permeability. The cellulose resin composition comprising a cellulose resin and a (A) compound represented by following general formula (1).

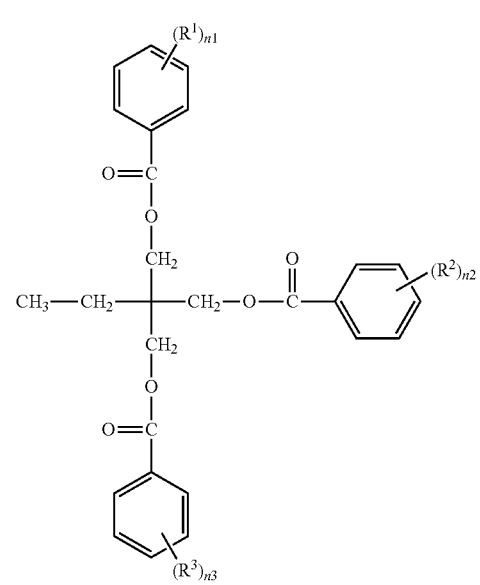

(wherein, n1 to n3 each represents a number of 1 to 3; and $R^1$, $R^2$ and $R^3$ each represents a hydrogen atom, an alkyl group having 1 to 4 carbon atoms or an alkoxy group having 1 to 4 carbon atoms, provided that $R^1$, $R^2$ and $R^3$ are not the same members at the same time). The cellulose resin film is obtained from this cellulose resin composition.

4 Claims, No Drawings

CELLULOSE RESIN COMPOSITION AND CELLULOSE RESIN FILM

The present application is the national stage application under 35 U.S.C. §371 of International application No. PCT/JP2009/052532, filed Feb. 16, 2009; the application claims priority under 35 U.S.C. §119 to Japanese application No. 2008-035554, filed on Feb. 18, 2008, the contents of which are hereby incorporated by reference.

TECHNICAL FIELD

The present invention relates to a cellulose resin composition and cellulose resin film. Particularly, the present invention relates to a cellulose resin composition and cellulose resin film which are suitably used for a polarizing plate and protective film for polarizing plate.

BACKGROUND ART

Compared to other synthetic resins, cellulose resins are mainly characterized by generally having a superior strength, transparency and gloss, as well as a smoother surface with excellent texture. Because of this, cellulose resins are used in a wide variety of applications, for example, sheets, films, wire coatings, toys, medical instruments, food packaging materials and the like.

However, since cellulose resins are not thermoplastic, there has been problems in that these resins, when molding, have to be melted at a high temperature or dissolved into a solvent, and that in cases where they are melted at a high temperature, they are simultaneously thermally decomposed and become colored. Therefore, in order to avoid such problems, it is necessary to blend an appropriate plasticizer which lowers the softening point of the cellulose resin. Examples of conventionally used plasticizer include triphenyl phosphate, tricresyl phosphate, diphenyl phosphate, triethyl phosphate, tributyl phosphate, dimethyl phthalate, diethyl phthalate, dimethoxyethyl phthalate, ethyl phthalyl ethyl glycolate, butyl phthalyl butyl glycolate, toluenesulfonamide, triacetin and pentaerythritol tetraacetate.

However, at present, none of the aforementioned plasticizers satisfies a wide range of performances such as compatibility with cellulose resins, plasticizing efficiency, non-volatility, stability against heat and light, non-migratory property, non-extractability and water resistance, and this is discouraging a further expansion of the use of cellulose resin compositions.

In view of this, a plasticizer having a hydrocarbon ring was proposed in Patent Document 1 and an ester compound of polyalcohol having different alkyl groups and aryl groups was proposed in Patent Document 2; however, these were not satisfactory.

In addition, recent years have seen the development in thinning and weight reduction of information devices equipped with a liquid crystal display such as laptop computers. At the same time, the demands for even thinner protective film for polarizing plate used in liquid crystal displays have increased.

Meanwhile, conventionally, cellulose triacetate films have been commonly and widely used for a protective film for polarizing plate, and a plasticizer has been added to such cellulose triacetate films in order to improve the film flexibility and to reduce the moisture permeability.

However, there have been cases where simple thinning of the aforementioned cellulose triacetate film increased the moisture permeability of the film and made it impossible to sufficiently reduce the moisture, thereby deteriorating the adhesive and polarizer when the film was made into a polarizing plate. As the solution to this problem, it can be considered to increase the amount of the plasticizer to compensate the amount reduced by the thinning; however, a mere increase in the amount of the plasticizer does not enable a sufficient improvement in the moisture permeability, and it has been found that such an increase in the amount of the plasticizer causes new problems, such as deterioration in the retainability. Here, deterioration in the retainability refers to a decrease of the film mass due to precipitation, evaporation and the like of the additive such as plasticizer to the outside of the film under a high temperature and humid environment. This retainability is poor in conventional cellulose ester films, resulting in a decrease in the performance of liquid crystal displays.

In view of the above, as the technique to improve these defects, Patent Document 3 proposes the use of citrate, while the use of pentaerythritol ester and dipentaerythritol is proposed in Patent Document 4. In addition, Patent Document 5 proposes the use of glyceride, while the use of diglycerol ester is proposed in Patent Document 6.

Patent Document 1: Japanese Unexamined Patent Application Publication No. 53-40039
Patent Document 2: Japanese Unexamined Patent Application Publication No. 54-71141
Patent Document 3: Japanese Unexamined Patent Application Publication No. 11-92574
Patent Document 4: Japanese Unexamined Patent Application Publication No. 11-124445
Patent Document 5: Japanese Unexamined Patent Application Publication No. 11-246704
Patent Document 6: Japanese Unexamined Patent Application Publication No. 2000-63560

DISCLOSURE OF THE INVENTION

Problems to be Solved by the Invention

Yet, although cellulose ester films having a good optical anisotropy can be obtained by using the cellulose resin compositions according to Patent Documents 3 to 6, none of them exhibited a sufficient moisture-permeability improving effect and deterioration in the retainability was observed as well.

Therefore, an object of the present invention is to provide a cellulose resin composition and cellulose resin film which prevent deterioration in the retainability and have a superior moisture permeability.

Means for Solving the Problems

In order to solve the aforementioned problems, the present inventors intensively studied to discover that the aforementioned object can be attained by adding to cellulose resin a specific trimethylolpropane triphenyl ester compound, thereby completing the present invention.

That is, the cellulose resin composition according to the present invention comprises a cellulose resin and a (A) compound represented by the following general formula (1):

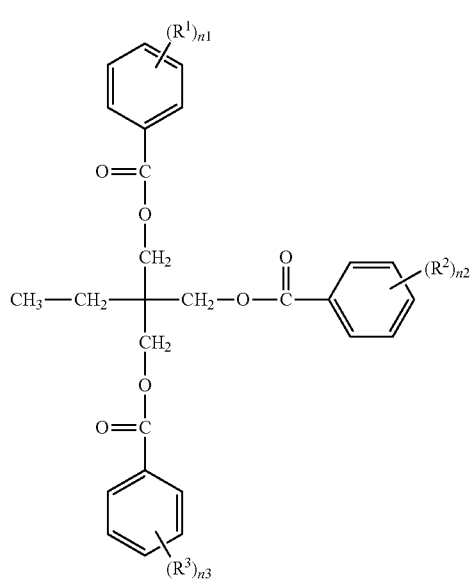

(wherein, n1 to n3 each represents a number of 1 to 3; and $R^1$, $R^2$ and $R^3$ each represents a hydrogen atom, an alkyl group having 1 to 4 carbon atoms or an alkoxy group having 1 to 4 carbon atoms, provided that $R^1$, $R^2$ and $R^3$ are not the same members at the same time).

Additionally, in the cellulose resin composition according to the present invention, it is preferred that at least one of the aforementioned $R^1$, $R^2$ and $R^3$ in the general formula (1) is a hydrogen atom and the aforementioned cellulose resin is cellulose triacetate. It is also preferred that the cellulose resin composition according to the present invention contains two or more of the (A) components.

Furthermore, the cellulose resin film according to the present invention is obtained from the aforementioned cellulose resin composition.

Effects of the Invention

According to the present invention, a cellulose resin composition and cellulose resin film which prevent deterioration in the retainability and have a superior moisture permeability can be provided.

BEST MODE FOR CARRYING OUT THE INVENTION

The embodiments of the present invention will be described concretely.

The cellulose resin used in the present invention is not particularly restricted; however, it is preferably a lower fatty acid ester of cellulose (hereinafter, also referred to as "cellulose ester"). The lower fatty acid in the lower fatty acid ester of cellulose refers to a fatty acid having not more than 6 carbon atoms. Examples of such lower fatty acid esters of cellulose include cellulose acetate, cellulose propionate, cellulose butyrate and the like, as well as mixed fatty acid esters such as cellulose acetate propionate and cellulose acetate butyrate that are described in Japanese Unexamined Patent Application Publication No. 10-45804, Japanese Unexamined Patent Application Publication No. 8-231761, the Description of U.S. Pat. No. 2,319,052 and the like. Among these lower fatty acid esters of cellulose, cellulose triacetate is more preferably used.

With regard to such cellulose triacetate, from the standpoint of the film strength, those having a polymerization degree of 250 to 400 and an average acetylation degree (an amount of bound acetic acid) of 54.0% to 62.5% are preferred, and those having an average acetylation degree of 58.0% to 62.5% are more preferred.

A particularly preferred lower fatty acid ester of cellulose is a cellulose ester which has an acyl group having 2 to 4 carbon atoms as the substituent and simultaneously satisfies the following formulae (I) and (II):

$$2.6 \leq X+Y \leq 3.0, \text{ and} \qquad \text{Formula (I)}$$

$$0 \leq X \leq 2.5, \qquad \text{Formula (II)}$$

wherein, X represents the substitution degree of the acetyl group and Y represents the substitution degree of the propionyl group or butyryl group.

Those moieties which are not substituted with an acyl group generally exist as a hydroxyl group.

Further, it is especially preferred that the aforementioned lower fatty acid ester of cellulose be a cellulose acetate propionate. Among the cellulose acetate propionates, those satisfying $1.9 \leq X \leq 2.5$ and $0.1 \leq Y \leq 0.9$ are more preferred, and these cellulose esters can be synthesized by a known method.

Moreover, as the cellulose ester in the present invention, cellulose esters synthesized using raw material such as cotton linter, wood pulp or kenaf may be used individually or in combination. It is particularly preferred to use a cellulose ester synthesized from cotton linter (hereinafter, may be simply referred to as linter) individually or in combination.

In the present invention, examples of the alkyl group having 1 to 4 carbon atoms represented by $R^1$, $R^2$ and $R^3$ in the general formula (1) include methyl, ethyl, propyl, isopropyl, butyl, isobutyl, sec-butyl and tert-butyl. Examples of the alkoxy group having 1 to 4 carbon atoms represented by $R^1$, $R^2$ and $R^3$ in the general formula (1) include methoxy, ethoxy, propoxy, isopropoxy, butoxy, isobutoxy, sec-butoxy and tert-butoxy.

Additionally, in the present invention, although $R^1$, $R^2$ and $R^3$ of trimethylolpropane triphenyl ester compound as (A) component are not the same members at the same time, it is especially preferred that at least one of $R^1$, $R^2$ and $R^3$ be a hydrogen atom.

Specific examples of the trimethylolpropane triphenyl ester compound as (A) component used in the present invention are described below.

Compound No. 1
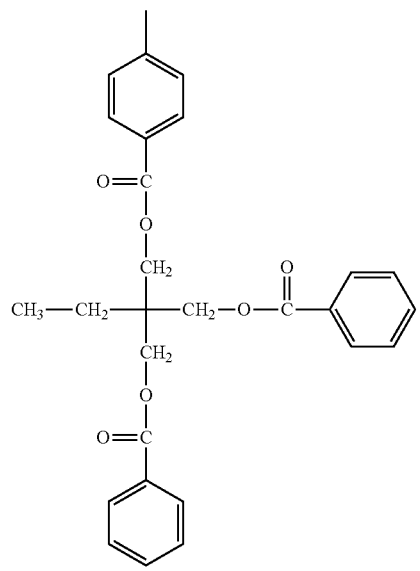
Compound No. 3
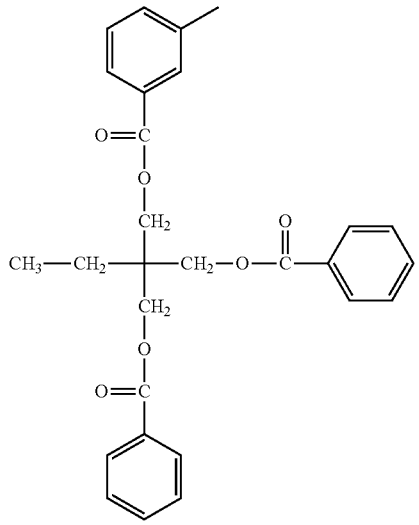
Compound No. 2
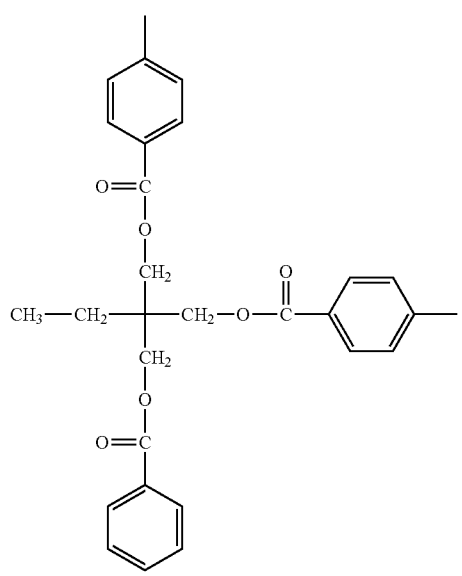
Compound No. 4
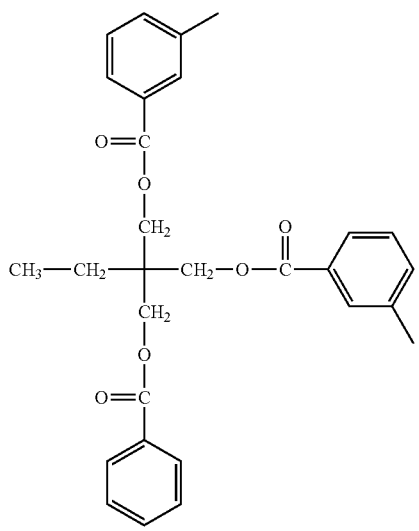

Compound No. 5
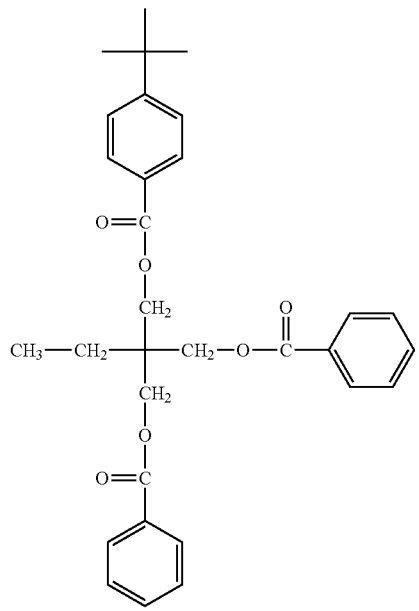
Compound No. 6
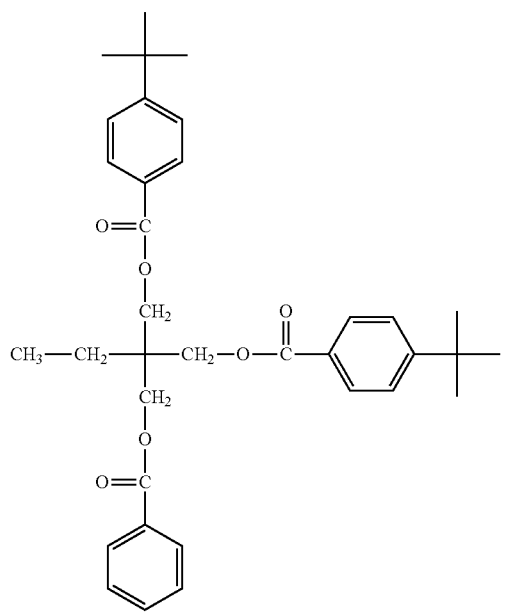
Compound No. 7
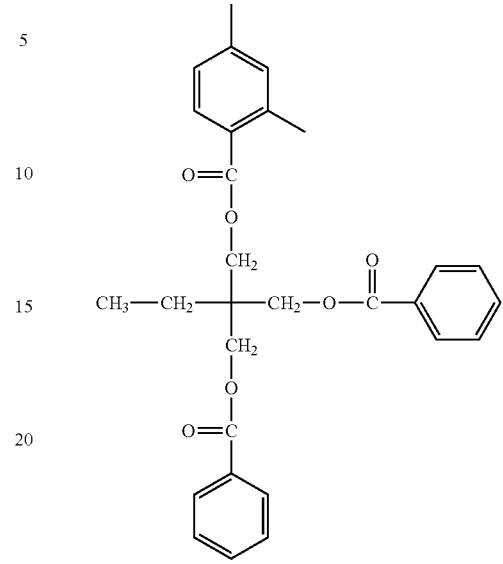
Compound No. 8
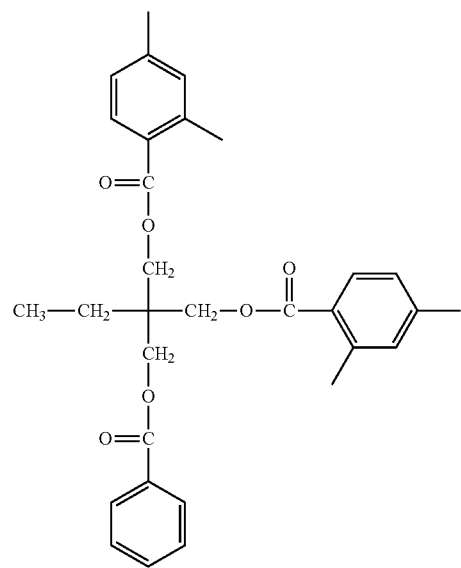

Compound No. 9

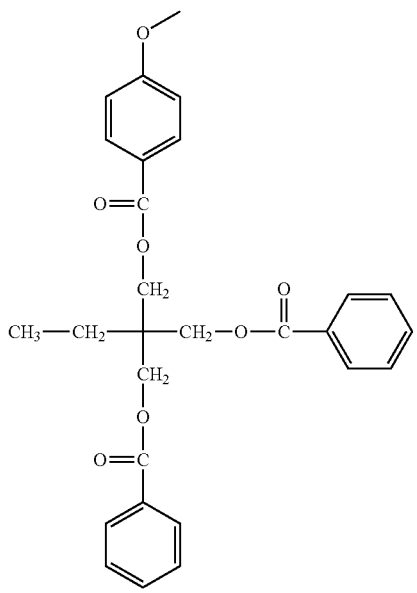

Compound No. 10

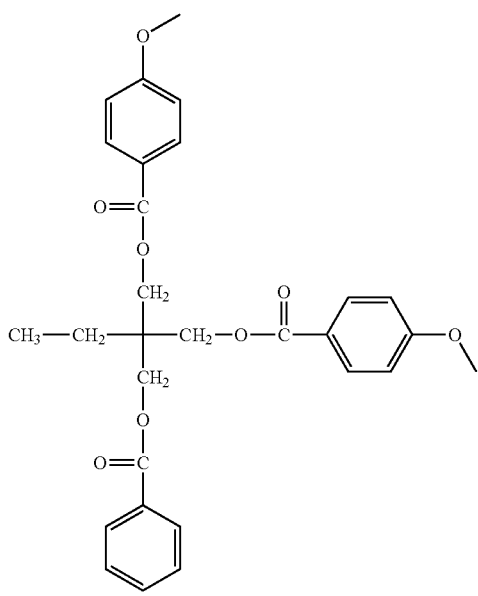

Compound No. 11

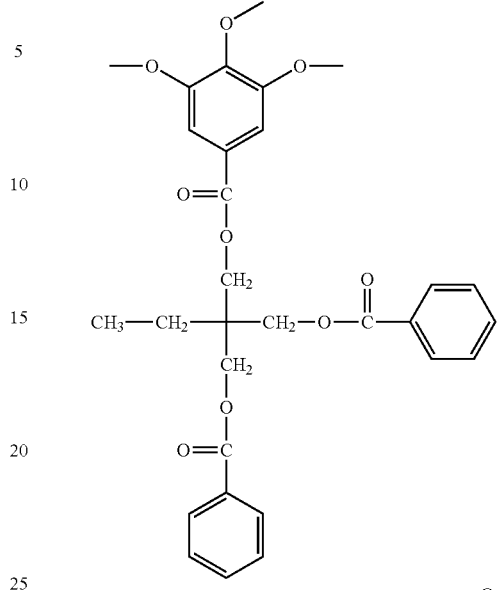

Compound No. 12

The trimethylolpropane triphenyl ester compounds as (A) component used in the present invention may be used alone, but the mixture thereof is preferably used.

The amount of the aforementioned trimethylolpropane triphenyl ester compound as the (A) component in the present invention is preferably 3 to 50 parts by mass, specifically preferably 5 to 20 parts by mass, with respect to 100 parts by mass of the cellulose resin. The flexibility-imparting effect may not be attained when the aforementioned amount is less than 3 parts by mass, and bleeding may occur when the amount exceeds 50 parts by mass, which are not preferred.

Further, various additives, for example, phosphorous antioxidant, phenolic antioxidant or sulfur antioxidant, ultraviolet absorbing agent, hindered amine light stabilizer and the like may also be blended in the cellulose resin composition of the present invention.

Examples of the aforementioned phosphorous antioxidant include triphenyl phosphite, tris(2,4-di-tert-butylphenyl)

phosphite, tris(nonylphenyl)phosphite, tris(dinonylphenyl) phosphite, tris(mono-, di-mixed nonylphenyl)phosphite, bis (2-tert-butyl-4,6-dimethylphenyl).ethyl phosphite, diphenyl acid phosphite, 2,2'-methylene-bis(4,6-di-tert-butylphenyl) octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithio phosphite, bis (neopenthyl glycol).1,4-cyclohexanedimethyl diphosphite, bis(2,4-di-tert-butylphenyl)pentaerythritol diphosphite, bis (2,6-di-tert-butyl-4-methylphenyl)pentaerythritol diphosphite, distearyl pentaerythritol diphosphite, phenyl-4,4'-isopropylidene diphenol.pentaerythritol diphosphite, tetra(C12-C15 mixed alkyl)-4,4'-isopropylidene diphenyl phosphite, bis[2,2'-methylene-bis(4,6-diamylphenyl)].isopropylidene diphenyl phosphite, hydrogenated-4,4'-isopropylidene diphenol polyphosphite, bis(octylphenyl).bis[4,4'-n-butylidene-bis(2-tert-butyl-5-methylphenol)].1,6-hexanediol-.diphosphite, tetramidecyl.4,4'-butylidene-bis(2-tert-butyl-5-methylphenol)diphosphite, hexa(tridecyl).1,1,3-tris(2-methyl-5-tert-butyl-4-hydroxyphenyl) butane.triphosphonite, 9,10-dihydro-9-oxa-10-phosphaphenanthrene-10-oxide and 2-butyl-2-ethyl-propanediol.2,4,6-tri-tert-butylphenol monophosphite.

Examples of the aforementioned phenolic antioxidant include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl) phosphonate, tridecyl.3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methyl benzyl)phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane] and triethylene glycol-bis[β-tert-butyl-4-hydroxy-5-methylphenyl)propionate].

Examples of the aforementioned sulfur antioxidant include dialkyl thiodipropionates, such as dilauryl thiodipropionate, dimyristyl thiodipropionate, myristylstearyl thiodipropionate and distearyl thiodipropionate, and β-alkylmercaptopropionates of polyols such as pentaerythritol tetra((β-dodecylmercaptopropionate).

Examples of the aforementioned ultraviolet absorbing agent include 2-hydroxybenzophenones such as 2,4-dihydroxybenzophenone, 2-hydroxy-4-methoxybenzophenone, 2-hydroxy-4-octoxybenzophenone, 2-hydroxy-4-tert-butyl-4'-(2-methacryloyloxyethoxyethoxy)benzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-C7 to C9 mixed-alkoxycarbonylethylphenyl) triazole, 2-(2-hydroxy-3,5-dicumylphenyl)benzotriazole, 2,2'-methylene-bis(4-tert-octyl-6-benzotriazolylphenol) and polyethylene glycol ester of 2-(2-hydroxy-3-tert-butyl-5-carboxyphenyl)benzotriazole; 2-(2-hydroxyphenyl)-1,3,5-triazines such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine and 2-(2-hydroxy-4-acryloyloxyethoxyphenyl)-4,6-bis(2,4-dimethylphenyl)-1,3, 5-triazine; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate.

Examples of the aforementioned hindered amine light stabilizer include 2,2,6,6-tetramethyl-4-piperidylstearate, 1,2,2, 6,6-pentamethyl-4-piperidylstearate, 2,2,6,6-tetramethyl-4-piperidylbenzoate, bis(2,2,6,6-tetramethyl-4-piperidyl) sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1, 2,3,4-butane tetracarboxylate, bis(2,2,6,6-tetramethyl-4-piperidyl).bis(tridecyl)-1,2,3,4-butane tetracarboxylate, bis (1,2,2,6,6-pentamethyl-4-piperidyl).bis(tridecyl)-1,2,3,4-butane tetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6, 6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6, 6-tetramethyl-4-piperidyl)amino)-s-triazine-6-yl]-1,5,8,12-tetraazadodecane, 1,5,8,12-tetrakis[2,4-bis(N-butyl-N-(1,2, 2,6,6-pentamethyl-4-piperidyl)amino)-s-triazine-6-yl]-1,5, 8,12-tetraazadodecane, 1,6,11-tris[2,4-bis(N-butyl-N-(2,2,6, 6-tetramethyl-4-piperidyl)amino)-s-triazine-6-ylamino] undecane, 1,6,11-tris[2,4-bis(N-butyl-N-(1,2,2,6,6-pentamethyl-4-piperidyl)amino)-s-triazine-6-ylamino] undecane, 3,9-bis[1,1-dimethyl-2-{tris(2,2,6,6-tetramethyl-4-piperidyloxycarbonyloxy)butylcarbonyloxy}ethyl]-2,4,8, 10-tetraoxaspiro[5.5]undecane, and 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5]undecane.

In addition to the above, as required, other additives may be blended with the cellulose resin composition of the present invention, and examples thereof include fillers, coloring agents, cross-linking agents, antistatic agents, anti-plate-out agents, surface treatment agents, lubricants, flame retardants, fluorescent agents, antifungal agents, antibacterial agents, metal inactivators, releasing agents, pigments, processing aids, antioxidants, light stabilizers and foaming agents.

The cellulose resin composition of the present invention can be used in a variety of applications by various known processing methods; however, because of the characteristics thereof, it is preferably used particularly as a film such as polarizing plate or protective film for polarizing plate.

The cellulose resin film of the present invention is obtained from the aforementioned cellulose resin composition. As an example, a method of producing a cellulose ester film which is obtained from a cellulose ester (hereinafter, may be referred to as "the cellulose ester film of the present invention") will be explained.

The cellulose ester film of the present invention is produced by applying and drying a dope solution in which a cellulose ester is dissolved in a solvent. Various additives may be added to the dope solution as required. The concentration of the cellulose ester in the dope solution is preferably high since it enables a reduction in the drying load after flow-casting the dope solution onto a substrate; however, when the concentration of the cellulose ester is too high, the filtering load is increased, thereby lowering the filtration accuracy. The concentration of the cellulose ester expected to attain reduction in both the drying load and filtering load is preferably 10 to 30 mass %, more preferably 15 to 25 mass %.

The solvent for the preparation of the dope solution of the present invention may be used individually or in combination with another solvent; however, from the standpoint of the production efficiency, it is preferred to use a good solvent and poor solvent of cellulose ester in combination. Preferred ranges of the mixing ratio of the good solvent and poor solvent are 70 to 98 mass % for the good solvent and 30 to 2 mass % for the poor solvent. With regard to the good solvent and poor solvent used in the present invention, a solvent which independently dissolves the cellulose ester used is defined as a good solvent, while a solvent which, by itself, can only swell the cellulose ester used or cannot dissolve the cellulose ester used, is defined as a poor solvent. Therefore, the good solvent and poor solvent are variable depending on the average acetylation degree of cellulose. For example, acetone is a good solvent for cellulose esters having an average acetylation degree of 55%, while it is a poor solvent for cellulose esters having an average acetylation degree of 60%.

As clearly seen from the explanation in the above, the good solvent and poor solvent are not unambiguously determined in all cases; however, in cases where cellulose triacetate is used as the cellulose resin, organic halogenated compounds such as methylene chloride and dioxolanes are exemplified as the good solvent and in cases where the cellulose resin is cellulose acetate propionate, methylene chloride, acetone, methyl acetate and the like are exemplified as the good solvent, while examples of poor solvent include methanol, ethanol, n-butanol, cyclohexane and cyclohexanone.

A conventional method can be used as the method of dissolving cellulose ester in the preparation of the aforementioned dope solution; however, it is preferred to employ a method in which cellulose ester is dissolved with stirring under pressure by heating in a temperature range which is not lower than the boiling point of the solvent under atmospheric pressure and where the solvent does not boil, since such method prevents generation of aggregated non-dissolved matter called gel or lump. Further, a method in which cellulose ester is mixed with a poor solvent to wet or swell the cellulose ester followed by dissolution thereof by further mixing with a good solvent is also preferably employed. Furthermore, a known cooling dissolution method may also be employed. In cases where a cooling dissolution method is employed, methyl acetate or acetone may be used as the good solvent. Pressurization can be carried out by a method of injecting inert gas such as nitrogen gas or by increasing the vapor pressure of the solvent by heating. It is preferred that the heating be done externally. For example, a jacket-type heater is preferably used since the temperature control is easy.

From the standpoint of the solubility of cellulose esters, as the heating temperature after the addition of solvent, a temperature range which is not lower than the boiling point of the solvent used under atmospheric pressure and where the solvent does not boil is preferred; however, when the heating temperature is too high, the required pressure is increased, thereby lowering the productivity. The heating temperature range is preferably 45 to 120° C., more preferably 60 to 110° C., still more preferably 70 to 105° C. Further, the pressure is adjusted in such a manner that the solvent does not boil at the preset temperature.

Next, this cellulose ester solution is filtered using an appropriate filter medium such as filter paper. As the filter medium, a filter having a small absolute filtration accuracy is preferred in order to remove undesired matters and the like; however, an excessively small absolute filtration accuracy leads to a problem that clogging of the filter medium is likely to occur. In view of this, the absolute filtration accuracy of the filter medium is preferably not greater than 0.008 mm, more preferably in the range of 0.001 to 0.008 mm, still more preferably in the range of 0.003 to 0.006 mm. The material of the filter medium is not particularly restricted and any conventional material may be used; however, filter media made of plastic such as polypropylene or Teflon (Registered Trademark) and those made of metal such as stainless metal are preferred since they do not cause fiber fall-off or the like.

The filtration of dope solution can be carried out by a conventional method; however, it is preferred to employ a method in which the dope solution is filtered under pressure while being heated at a temperature range which is not lower than the boiling point of the solvent used under atmospheric pressure and where the solvent does not boil, since such method achieves only a small increase in the difference between the pressures on each side of the filter medium (hereinafter, may be referred to as filtration pressure). The filtration temperature is preferably 45 to 120° C., more preferably 45 to 70° C., still more preferably 45 to 55° C. A smaller filtration pressure is preferred. The filtration pressure is preferably not higher than $1.6 \times 10^6$ Pa, more preferably not higher than $1.2 \times 10^6$ Pa, still more preferably not higher than $1.0 \times 10^6$ Pa.

As the substrate used in the flow-casting (casting) step, those of mirror-finished stainless steel in the shape of an endless belt or drum are preferred. It is preferred that the temperature of the substrate used in the casting step be 0° C. to below the boiling point of the solvent. A higher temperature enables a faster drying speed; however, an excessively high temperature may cause foaming and deteriorate the flatness of the substrate surface. The substrate temperature is preferably 0 to 50° C., more preferably 5 to 30° C. The method to control the substrate temperature is not particularly restricted; however, a method in which warm air or cool air is blown onto the substrate or a method in which a warm-water vat is brought into contact with the substrate may be employed. Among these two methods, the method of using a warm-water vat is more preferable since the heat transfer is more efficient and the time required to bring the substrate temperature constant is shorter. In cases where warm air is used, it is necessary that the temperature of the air be higher than the target temperature. In order to allow the cellulose ester film to exhibit a good surface flatness, the amount of remaining solvent at the time of film removal from the substrate is preferably 10 to 120%, more preferably 20 to 40% or 60 to 120%, and especially preferably 20 to 30% or 70 to 115%.

In the present invention, the amount of remaining solvent is defined by the following formula:

The amount of remaining solvent=[(film mass before heat treatment−film mass after heat treatment)/ (film mass after heat treatment)]×100(%).

Here, the heat treatment in the measurement of the amount of remaining solvent refers to heating of the film at 115° C. for 1 hour. Further, in the step of drying the cellulose ester film, the film removed from the substrate is further dried in such a manner the amount of remaining solvent becomes preferably not more than 3 mass %, more preferably not more than 0.5 mass %. Generally employed in the film drying step is a method in which the film is dried while being carried by a roll suspension method or tenter method.

Further, it is preferred that the maintenance of the film width and film drawing be carried out by a tenter method while a large amount of solvent still remains immediately after removing the film from the substrate, since this enables the film to demonstrate a superior dimensional stability improving effect. The means for drying the film is not particularly restricted, and it is carried out with hot air, infrared radiation, heating roller, microwave or the like. It is preferred to use hot air from the standpoint of simplicity. It is preferred that the drying temperature be stepwise increased in the range of 40 to 150° C., and in order to improve the dimensional stability, it is more preferred that the drying be carried out at a temperature of 50 to 140° C.

It is preferred that the cellulose ester film have a less thickness since the resulting polarizing plate would be thinner and thus the thinning of liquid crystal display would be easier; however, an excessively thin cellulose ester film leads to an increase in the moisture permeability, thereby making the tearing strength and the like insufficient. In order to attain both low moisture permeability and sufficient tearing strength, the thickness of the cellulose ester film is preferably 10 to 65 µm, more preferably 20 to 60 µm, still more preferably 35 to 50 µm.

Since the cellulose ester film of the present invention can attain a low moisture permeability and high dimensional stability and the like, it is preferably used as a liquid crystal display member. A liquid crystal display member refers to a member used in a liquid crystal display device and examples thereof include polarizing plate, protective film for polarizing plate, phase plates, reflective plates, viewing angle-improving films, antiglare films, non-reflective films, antistatic films and the like. Thereamong, the cellulose ester film of the present invention is preferably used for a polarizing plate and protective film for polarizing plate.

The polarizing plate can be produced by a conventional method. For example, there is a method in which the cellulose ester film of the present invention is subjected to an alkaline saponification treatment and subsequently, using a completely saponificated polyvinyl alcohol solution, the resultant is pasted onto both sides of a polarizing film produced by immersion in an iodine solution and drawing therefrom. The alkaline saponification treatment refers to a treatment in which cellulose ester film is immersed in a hot strong alkaline solution in order to improve the wetting of water-based adhesive and its adhesive property.

The smaller the retardation Ro (nm) in the film in-plane direction of the aforementioned cellulose ester film, the more preferable it is. The retardation Ro (nm) is preferably not greater than 100 nm, more preferably not greater than 10 nm, and still more preferably not greater than 5 nm. In cases where the cellulose ester film of the present invention is used as a retarder film, the Ro (nm) thereof is preferably 50 to 1,000 nm. As for the determination of the retardation Ro, the three-dimensional refractive index of the cellulose ester film at a wavelength of 590 nm is measured using an automatic double refractometer to determine the retardation axis angle $\theta_1$ and refractive indices Nx and Ny, and the retardation Ro in the film in-plane direction is then calculated according to the following formula:

$Ro=(Nx-Ny) \times d$.

In this formula, Nx, Ny and d represent, respectively, the film refractive index in the direction parallel to the film-forming direction, the film refractive index in the direction perpendicular to the film-forming direction, and the film thickness (nm).

In cases where the cellulose ester film of the present invention is used as an optical film, the closer the angle $\theta_0$ between the film-forming direction (this corresponds to the film longitudinal direction) and the film retardation axis is to 0°, +90° or −90°, the more preferable it is. The angle $\theta_0$ contributes to an improvement of the degree of polarization of the resulting polarizing plate, especially when the cellulose ester film of the present invention is used as a protective film for polarizing plate. Here, the retardation axis means the direction in which the refractive index in the film surface is the highest. Further, it is preferred that the $\theta_1$ (radian) ($\theta_1$ is obtained by converting the $\theta_0$ into a radian expression) and the retardation $R_o$ in the film in-plane direction satisfy the relation represented by the following formula:

$p \leq 1-\sin^2(2\theta_1) \cdot \sin^2(\pi R_o/\lambda)$.

The p is preferably not less than 0.99900, more preferably not less than 0.99990, still more preferably not less than 0.99995, and especially preferably not less than 0.99999. The $\lambda$ represents the wavelength (nm) of the light, which is in the range of 380 to 650 nm, used in the measurement of the three-dimensional refractive-index for determining the Ro and $\theta_1$. The above formula is satisfied preferably when $\lambda$ is 590 nm, more preferably when $\lambda$ is 400 nm.

EXAMPLES

The cellulose resin composition of the present invention will be described in more detail by way of Examples; however, the present invention is not limited thereto.

Examples 1-1 to 1-6 and Comparative Examples 1-1 to 1-2

Acetylcellulose (acetylation degree of 61.5%, polymerization degree of 260) was dissolved with stirring into a mixed solvent comprising 90 parts by mass of methylene chloride and 10 parts by mass of methyl alcohol to obtain a solution having a concentration of 15%. Mixed therewith was the plasticizer according to Table 1 below at an amount of 10 mass % with respect to the acetylcellulose, and the thus obtained solution was flow-casted onto a metal substrate to produce a film having a thickness of approximately 0.1 mm.

Next, using the thus obtained films (samples), various performance tests described in the following were carried out. The results thereof are together shown in Table 1 below.
(Evaluation of Bleeding)

The samples were cut into a size of 10 cm×10 cm, left to stand for a day at 23° C. and 55% RH, and then left to stand for 2 weeks under a condition of 80° C. and 90% RH. The thus cut samples were further left to stand for a day at 23° C. and 55% RH and thereafter, the bleeding on the sample surface was visually observed. The evaluation was carried out in accordance with the three criteria in the following.
○; no bleeding
Δ; some bleeding
x; extensive bleeding
(Evaluation of Mass Loss by Moist-Heat Treatment)

The mass change before and after the moist treatment was measured and the mass loss by moist-heat treatment (%) was determined using the following formula:

Mass loss by moist-heat treatment(%)=[$(A-B)/A$]×100.

In the above formula, A represents the mass before the moist treatment and B represents the mass after the moist treatment. From the standpoint of the stabilities in the physical properties and dimension of the cellulose resin composition, it is preferred that the mass loss by moist-heat treatment be less than 1%.

(Evaluation of Moisture Permeability)

The moisture permeability was measured in accordance with the method described in JIS Z 0208. The measurement condition was set at 25° C. and 90% RH. In order to prevent the adhesive and polarizer from being deteriorated by moisture, the moisture permeability is preferably not higher than 300 g/m², more preferably not higher than 200 g/m², still more preferably not higher than 150 g/m².

TABLE 1

|  | Plasticizer | Bleeding | Mass loss by moist-heat treatment | Moisture permeability |
|---|---|---|---|---|
| Example 1-1 | No. 1/No. 2 (1/1)*¹ | ○ | 0.3 | 108 |
| Example 1-2 | No. 3/No. 4 (1/1)*¹ | ○ | 0.2 | 112 |
| Example 1-3 | No. 5/No. 6 (1/1)*¹ | ○ | 0.2 | 118 |
| Example 1-4 | No. 7/No. 8 (1/1)*¹ | ○ | 0.3 | 111 |
| Example 1-5 | No. 9/No. 10 (1/1)*¹ | ○ | 0.2 | 113 |
| Example 1-6 | No. 11/No. 12 (1/1)*¹ | ○ | 0.3 | 101 |
| Comparative Example 1-1 | No. A*² | X | 0.2 | 165 |
| Comparative Example 1-2 | No. B*³ | X | 0.3 | 158 |

*¹No. 1 to No. 12 of plasticizer correspond to the above-described Compounds No. 1 to No. 12, respectively. The figures in parenthesis mean molar ratio of plasticizers.
*²No. A is the following Compound No. A.
*³No. B is the following Compound No. B.

Compound No. A

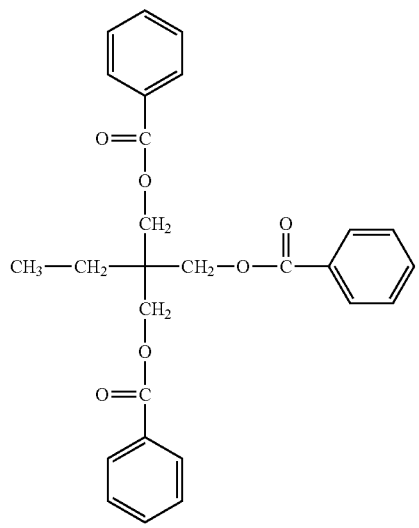

Compound No. B

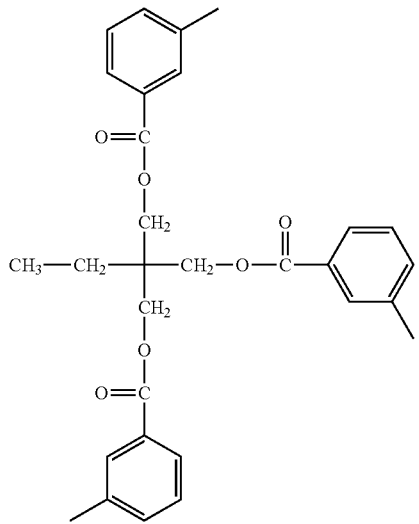

Despite trimethylolpropane triphenyl ester compound, when the compound, whose every phenyl group is unsubstituted or every substituent is the same (Comparative examples 1-1 and 1-2) was used, bleeding occurred and the moisture permeability improving effect was not sufficient. In contrast, when a specific trimethylolpropane triphenyl ester compound of the present invention (Examples 1-1 to 1-6) was used, there was no bleeding and the films had excellent resistance to mass loss by moist-heat treatment resulting in good retainability and excellent moisture permeability.

The invention claimed is:

1. A cellulose resin composition comprising a cellulose resin and a (A) compound in an amount of from 4 to 40 parts by mass and represented by the following general formula (1):

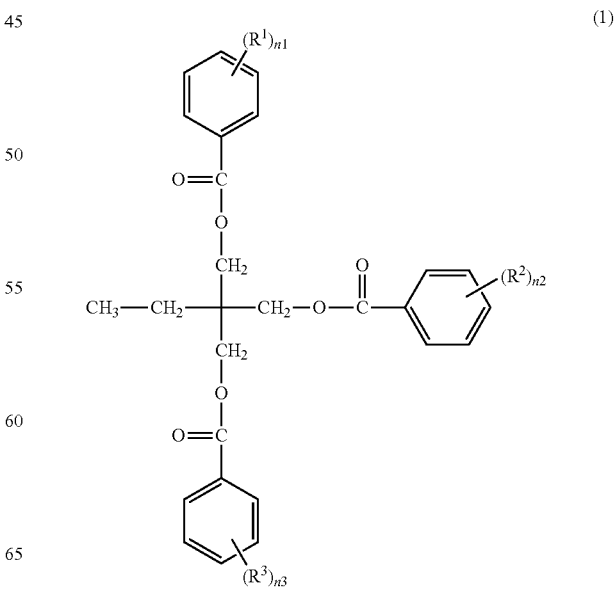

(1)

wherein, n1 to n3 each represents a number of 1 to 3; and $R^1$, $R^2$ and $R^3$ each represents a hydrogen atom, an alkyl group having 1 to 4 carbon atoms or an alkoxy group having 1 to 4 carbon atoms, provided that $R^1$, $R^2$ and $R^3$ are not the same members at the same time, and wherein two or more of the (A) components are contained.

2. The cellulose resin composition according to claim 1, wherein at least one of the $R^1$, $R^2$ and $R^3$ in the general formula (1) is a hydrogen atom.

3. The cellulose resin composition according to claim 1, wherein the cellulose resin is cellulose triacetate.

4. A cellulose resin film obtained from the cellulose resin composition according to claim 1.

* * * * *